United States Patent [19]

Pabbati et al.

[11] Patent Number: 5,915,004
[45] Date of Patent: Jun. 22, 1999

[54] MOVING A MESSAGING SYSTEM MAILBOX

[75] Inventors: Ramesh B. Pabbati, Redmond; Patrick Y. Ng, Seattle; John H. Howard, Redmond; William H. Rockenbeck, Woodinville; Max L. Benson, Redmond, all of Wash.

[73] Assignee: Microsoft Corporation, Redmond, Wash.

[21] Appl. No.: 08/680,217

[22] Filed: Jul. 11, 1996

[51] Int. Cl.[6] .................................................. H04M 11/00
[52] U.S. Cl. ................................ 379/100.08; 379/67.1; 379/88.18
[58] Field of Search ........................... 379/93.101, 93.14, 379/93.24, 93.25, 67.1, 100.8, 207, 88.18; 455/4.14; 358/426

[56] References Cited

U.S. PATENT DOCUMENTS

| | | | |
|---|---|---|---|
| 4,933,967 | 6/1990 | Lo et al. ................................... | 379/207 |
| 4,994,926 | 2/1991 | Gordon et al. ........................... | 358/400 |
| 5,218,699 | 6/1993 | Brandle et al. .......................... | 395/650 |
| 5,247,676 | 9/1993 | Ozur et al. ............................... | 395/650 |
| 5,283,856 | 2/1994 | Gross et al. .............................. | 395/51 |
| 5,291,600 | 3/1994 | Lutz et al. ................................ | 395/700 |
| 5,293,251 | 3/1994 | Corcoran et al. ........................ | 358/426 |
| 5,659,599 | 8/1997 | Arumainayagam et al. ........... | 379/67.1 |
| 5,680,444 | 10/1997 | Reeves ....................................... | 379/67 |
| 5,787,153 | 7/1998 | Bankay et al. ........................ | 379/88.18 |

FOREIGN PATENT DOCUMENTS 0 693 847   1/1996   European Pat. Off. ......... H04M 3/50

OTHER PUBLICATIONS

Shirley, John and Rosenberry, Ward, "Microsoft RPC Programming Guide", O'Reilly & Associates, 1995.

Kramer, Matt, "Baranof's MailCheck 2.6 Delivers Improved Tools", PC Week, Sep. 11, 1995, Ziff–Davis Publishing Company 1995.

Frenkel, Gary, "cc:Mail View Keeps an Eye on Your Messaging System", Network Computing, Jun. 1, 1995, CMP Publications, Inc., 1995.

Primary Examiner—Curtis A. Kuntz
Assistant Examiner—Melur Ramakrishnaiah
Attorney, Agent, or Firm—Workman, Nydegger, Seeley

[57] ABSTRACT

A messaging system user's mailbox is moved using a method in which the mailbox is flagged as being moved and a message arriving for the user during the move is delivered to a holding area to await re-delivery to the mailbox after the move is completed. A combination of non-volatile memory and volatile memory is used to ensure the message's delivery in the event of a power loss or other system failure.

20 Claims, 3 Drawing Sheets

MOVING A MESSAGING SYSTEM MAILBOX

BACKGROUND OF THE INVENTION

The invention is directed to messaging systems.

A messaging system typically delivers a message from one messaging system user to another across a computer connection. The message is delivered by storing the message in the user's messaging system mailbox. The mailbox is a data storage area to which the user has access for reading and otherwise manipulating the user's messages. The data storage area is typically made up of one or more computer databases, one or more computer files, one or more computer tables or folders, or a combination. The user's mailbox is typically stored along with other users' mailboxes on a messaging server computer in a computer-readable storage medium such as a hard disk.

A messaging system may include multiple servers that are connected on a network. In such a system, each server includes a directory that indicates, for each mailbox, the server on which the mailbox is stored. To deliver the message to the user, the system first consults the directory to determine which server stores the user's mailbox, and then directs the message to that server for delivery into the user's mailbox.

A user's mailbox may need to be moved from its original server (I) to another server (II) if, for example, storage space on server I becomes an issue or the user changes locations and is assigned to use server II. A typical mailbox move can take many minutes or hours, because the mailbox typically contains a large amount of data in the form of messages and folders of messages that must be moved. Some methods exist for accomplishing the move of the mailbox, but each of these existing methods is prone to message delivery failure or message loss or both. Message delivery failure causes the sender of a message to receive a non-delivery report that indicates that the message was undeliverable. Message loss occurs when the intended recipient-user does not receive a message and the sender of the message does not receive a non-delivery report. Both message delivery failure and message loss are undesirable, because both reduce the efficiency and reliability of the messaging system.

One existing method of moving a user's mailbox includes the following sequence of steps: (1) a new mailbox is created for the user on server II, (2) the directories of both servers are updated to direct messages, that are arriving for user, to the new, i.e., server II, mailbox instead of to the server I mailbox, (3) the contents of the server I mailbox are copied to the server II mailbox, and (4) the server I mailbox is deleted. Thus, new messages that arrive for the user during the move are delivered to the user's server II mailbox. If the move is successfully completed, the end result is that the server II mailbox contains the messages copied from the server I mailbox as well as the new messages. However, in the event that the move fails and must be restarted due to, for example, a system failure during the copying step, the user loses the new messages that arrived during the failed move. The messages are lost because the messages become unrecoverable when the move is restarted and a new mailbox is created again on server II.

In the first existing method, the directories are updated before the contents are copied. By contrast, in a second existing method of moving a user's mailbox, the directories are updated after the contents are copied. Thus, the sequence of the second existing method is: (1) a new mailbox is created for the user on server II, (2) the contents of the server I mailbox are copied to the server II mailbox, (3) the directories of both servers are updated to direct messages, that are arriving for user, to the new server II mailbox instead of to the server I mailbox, and (4) the server I mailbox is deleted. In this method, new messages that arrive for the user during the move are delivered to the user's server I mailbox. During step (2), the copying is typically accomplished folder-by-folder. For example, the contents of a "new unread messages" folder of the server I mailbox are copied to a "new unread messages" folder of the server II mailbox. Therefore, if a message is delivered to the server I "new unread messages" folder after the contents of that folder have already been copied, that message is never copied and is lost when the server I mailbox is deleted in step (4). If there is one such server I folder that collects all new messages that arrive for the user during the move, it is advantageous to copy that folder last. Copying that folder last minimizes the window of time during which a new message can be lost, because new messages are re-directed to the server II mailbox in step (3) immediately after the last folder is copied.

In a typical system, however, new messages are not delivered to only one folder in the mailbox. For example, according to one or more automatic folder-storage rules, new messages may be directed to different folders depending on the characteristics of the message. New messages may also be automatically directed to different folders according to subject matter. Therefore, in a typical system using this second existing method, the window of time during which a new message can be lost cannot be significantly minimized, because there is no single folder that can be copied last to capture all new messages received during the move.

A third existing method of moving a user's mailbox also involves updating the directories after the contents are copied, but, unlike in the second existing method, message delivery from other servers is suspended during copying. Thus, in the third existing method, the following sequence of steps is used: (1) the delivery of new messages from other servers to all mailboxes on server I is suspended and the new messages from the other servers are queued outside server I, (2) a new mailbox is created for the user on server II, (3) the contents of the user's server I mailbox are copied to the server II mailbox, (4) the directories of both servers are updated to direct messages, that are arriving for user, to the new server II mailbox instead of to the server I mailbox, (5) the server I mailbox is deleted, and (6) the messages queued outside server I are delivered in accordance with the updated directories. This third existing method results in both message delivery failure and message loss. Message deliver failure can occur in this method simply due to the delay in delivery as a result of the move, especially if step (3) takes hours. This failure occurs when the delay causes the delivery time to exceed the maximum delivery time expected by the sending server, which then uses a non-delivery report to indicate to the message's sender that the message could not be delivered.

In this third existing method, message delivery failure also occurs with respect to all new messages directed from server II to the user's mailbox during the move. These failures occur because server II detects a circular path, from server II back to server II, for each of these new messages when the new messages are delivered in step (6). The circular path results because the messages are sent from server II and are directed in step (6) to the new mailbox which is stored on server II. Failing to deliver messages for which a circular path is detected is a standard error-detection feature of messaging systems.

Due to a standard optimization feature of messaging systems, message loss occurs in this third existing method with respect to messages directed from server I to the user's mailbox during the move. In the optimization feature, messages directed from a server to a destination mailbox on the same server take a different path from messages directed to that destination mailbox from outside the server. As a result, in this method, messages directed from server I to the user's mailbox are not queued but are in fact delivered to the user's server I mailbox. As discussed above with respect to the second existing method of moving a mailbox, new messages are typically not delivered to only one folder in the mailbox. Therefore, these messages directed from server I are subject to being missed during the copying step (3) and are therefore subject to being lost.

Finally with respect to this third existing method, the delay in delivery is not limited to messages directed to the mailbox being moved, but exists for all messages directed from outside server I to mailboxes on server I. Thus, all users with mailboxes on server I are affected, even though only one user's mailbox is being moved. As a result, for example, all of these users can experience several such delays per day if several mailboxes are moved each day.

A fourth existing method of moving a user's mailbox also involves updating the directories after the contents are copied, but, unlike in the previous existing methods, the mailbox is listed in neither directory during copying. The fourth existing method thus includes the following sequence of steps: (1) the directory of server I is changed so that the mailbox to be moved is not listed in that directory, (2) a new mailbox is created for the user on server II without listing the new mailbox in the server II directory, (3) the contents of the user's server I mailbox are copied to the server II mailbox, (4) the directories of both servers are updated to direct messages, that are arriving for user, to the new server II mailbox instead of to the server I mailbox, and (5) the server I mailbox is deleted. In this method, message delivery failure occurs for all new messages that arrive for the user between steps (1) and (4). These failures occur because these messages cannot be delivered to either the server I mailbox or the server II mailbox. These messages cannot be delivered to the server I mailbox because the server I mailbox is not listed in the server I directory. And these messages cannot be delivered to the server II mailbox because none of the system's directories has a listing for the server II mailbox.

SUMMARY OF THE INVENTION

A user's messaging system mailbox is moved using a technique in which the mailbox is flagged as being moved, which causes a message arriving for the user during the move to be temporarily delivered to a holding area to await redelivery to the mailbox after the move is completed. Thus, messages are reliably received during the move of the mailbox, which minimizes move-related message loss and message delivery failure. Message loss is minimized by providing a destination, i.e., the holding area, to which these messages are temporarily delivered. Message delivery failure is minimized because providing the holding area reduces circular paths and because temporary delivery reduces the move-related delivery delays perceived by the sources of these messages.

Preferably, these messages are reliably delivered even if the move fails before the move is completed, because the holding area is implemented in non-volatile memory and these messages are re-delivered before the move is restarted. The operation of other mailboxes is not disrupted by the method of the invention. Overlapping and improper attempts to move the mailbox are automatically prevented. An apparent significant delay in delivery of the message is avoided. The message may originate at the same network location at which the temporary data storage area is located. More than one mailbox may be moved simultaneously. Preferably, detecting which mailboxes are being moved is simplified, because only one list, a "mailboxes associated with moving" list, is provided instead of two separate "mailboxes leaving" and "mailboxes arriving" lists.

In one aspect, the invention features a method for moving a messaging system user's mailbox from a first network location to a second network location (e.g., from one server to another server), the method including creating a new mailbox at the second network location, beginning copying the contents of the mailbox to the new mailbox, intercepting a message arriving for the recipient, delivering the message to a temporary data storage area, completing copying the contents to the new mailbox, and delivering the message from the temporary data storage area to the new mailbox.

Implementations of the method may include one or more of the following features.

The mailbox may include a folder of messages and the message may be delivered to the folder according to at least one automatic folder-storage rule. The temporary data storage area may be non-volatile and may retain the message in the event the move is not completed. The method may further include marking the mailbox with a flag to indicate that the mailbox is in the process of moving, so that the message may be intercepted based on the flag. The flag may be stored in a volatile memory so that in the event of a power loss during the move, the mailbox is automatically unmarked.

Multiple mailboxes may be moved at the same time, a list of marked mailboxes may exist at each network location, and the list may include every mailbox moving to the network location and every mailbox moving away from the network location. Each network location may include a directory associating mailboxes with network locations and each directory may be updated directly to associate the new mailbox with the second network location. The message may originate at the second network location and the temporary data storage area may be located at the second network location.

The technique may be implemented in hardware or software, or a combination of both. Preferably, the technique is implemented in computer programs executing on programmable computers that each include a processor, a storage medium readable by the processor (including volatile and non-volatile memory and/or storage elements), at least one input device, and at least one output device. Program code is applied to data entered using the input device to perform the method described above and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other features and advantages will become apparent from the following description, including the drawings, and from the claims.

DESCRIPTION OF THE PREFERRED EMBODIMENTS

Figure 1:
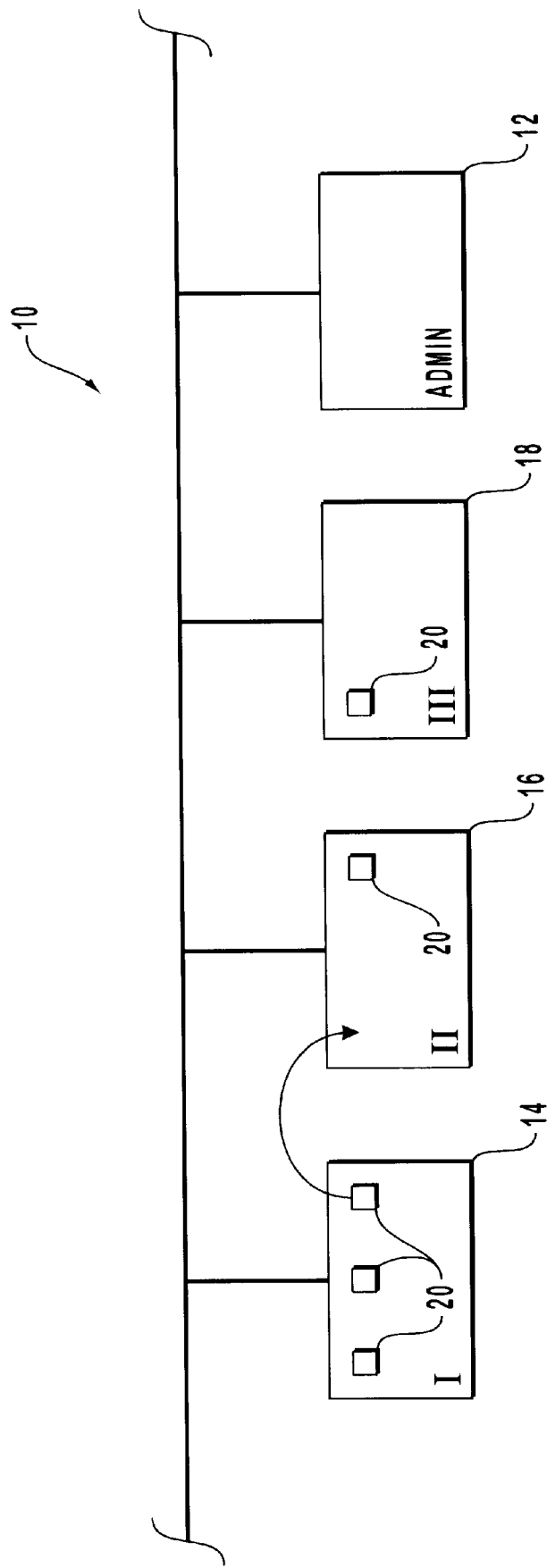
FIG. 1 is a block diagram of messaging server computers connected in a messaging system.

FIG. 1 illustrates a preferred messaging system 10 in which one messaging server computer 12 has an administrative function ("administrator") and is connected to three other messaging server computers 14, 16, 18 ("server I," "server II," and "server III"). Each server computer stores one or more messaging system mailboxes 20, each of which corresponds to one user of the system. A message directed to a user is delivered to the user's mailbox.

The administrator, which may instead be associated with one of the servers I, II, or III, has a "move-mailbox" subfunction. As described in more detail below, the "move-mailbox" subfunction is able to move a mailbox from one server, e.g., server I, to another server, e.g., server II.

Figure 2:
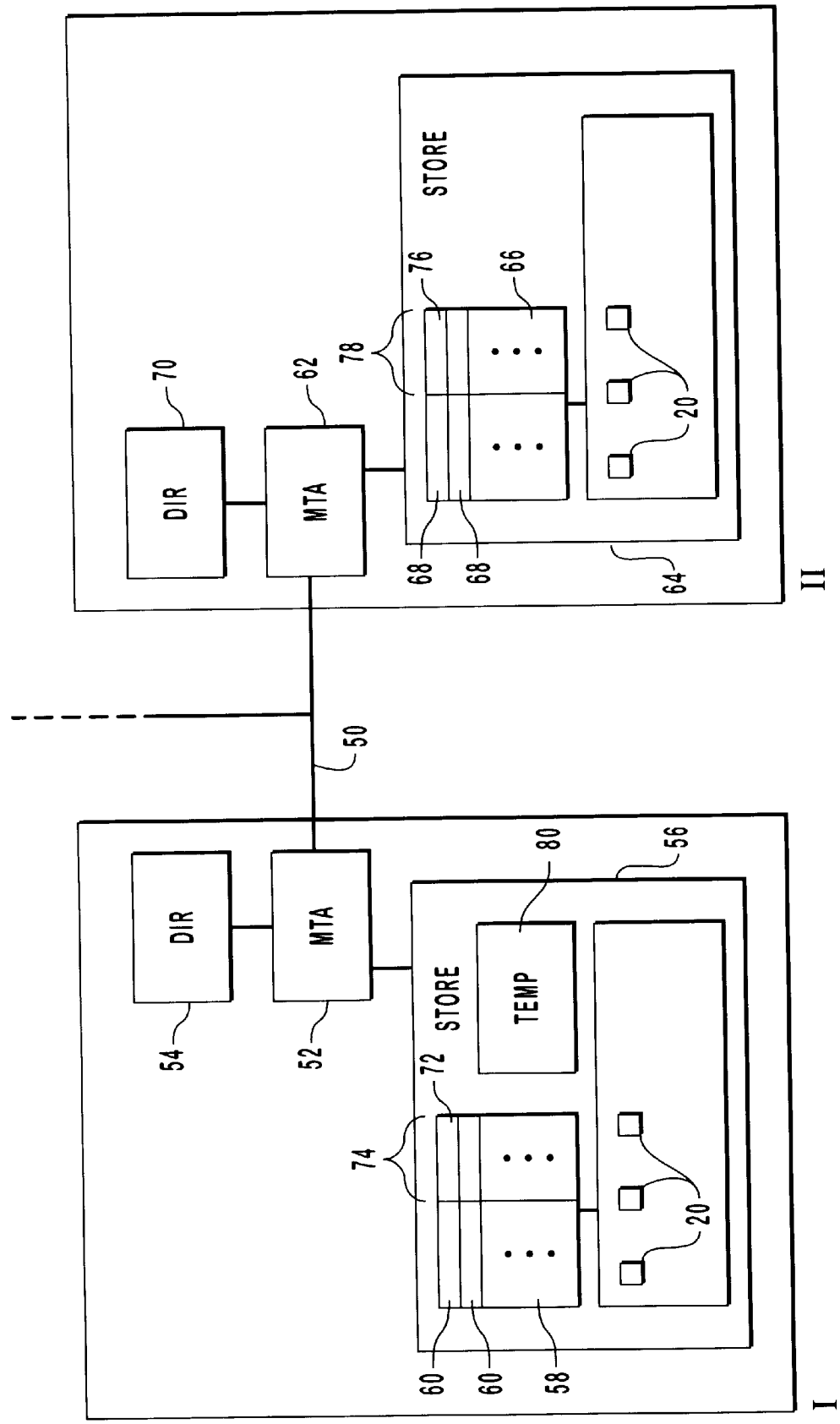
FIG. 2 is a block diagram of two servers connected in a messaging system.

FIG. 2 illustrates the preferred components of servers I and II. A message, directed to a user having a mailbox on server I, is delivered in one of the following two ways, depending on whether the source, i.e., the sender, of the message corresponds to server I. If the message's source does not correspond to server I, e.g., corresponds to server II, the message arrives at server I via the connection 50 between the servers. A message transfer agent ("MTA") 52 of server I consults a server I directory 54 to confirm that server I stores a mailbox 20 corresponding to the user, and then the message is delivered to the user's mailbox.

On the other hand, if the message's source corresponds to server I, i.e., corresponds to another mailbox in server I's store 56 of mailboxes, the message is delivered using an optimization technique that does not involve the MTA. In the optimization technique, server I's local mailbox table 58, which lists all of the mailboxes stored on server I, is consulted to confirm that the table 58 has an entry 60 corresponding to the user's mailbox. The message is then delivered to the mailbox 20 without ever reaching the MTA 52 or the system connection 50.

Server II preferably has its own mailboxes 20, MTA 62, store 64, local mailbox table 66, entries 68, and directory 70.

Figure 3:
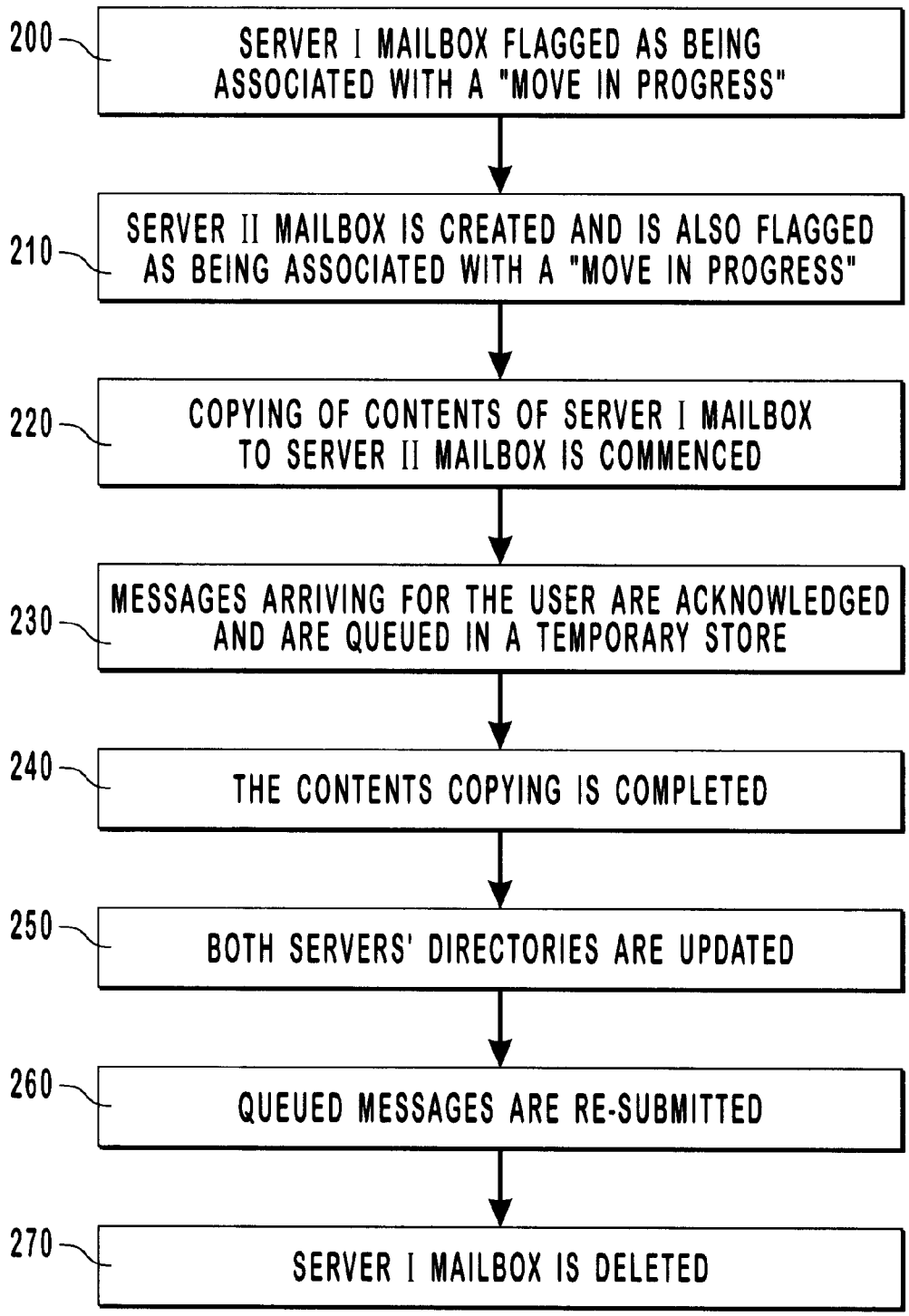
FIG. 3 is a flow chart of a procedure for moving a messaging system mailbox from one server to another server.

As mentioned above, the administrator has a "move-mailbox" subfunction that can, for example, move a mailbox from server I to server II. FIG. 3 illustrates the steps taken by the subfunction to accomplish such a move. Following a description of the steps is a discussion of the ability of the subfunction to deliver, reliably and in a timely manner, messages that arrive for a user while the user's mailbox is being moved from server I to server II.

The steps are now described, with reference to FIGS. 2 and 3. First, the server I mailbox is flagged as a mailbox associated with a move in progress (step 200). The mailbox is so flagged by confirming that the mailbox is available for moving and then marking the mailbox's entry 60 in the server I local mailbox table 58 with a flag 72. The mailbox is confirmed as being available for moving by confirming that (1) the mailbox exists, i.e., the mailbox has an entry in the server I local mailbox table, (2) the mailbox is not already being moved, i.e., the mailbox's entry is not already marked with a flag, and (3) the mailbox is not under a special move-preventing restriction such as a security restriction. More than one mailbox can be moved at a time. The flagged entries make up a list 74 of moving mailboxes.

Next, a new mailbox is created in the server II store 64 and the new mailbox is flagged as a mailbox associated with a move in progress (step 210). The new server II mailbox is created and flagged by (1) confirming that the store 64 can accept the new mailbox, (2) adding the mailbox to the store, and (3) adding a corresponding entry 68 marked with a flag 76 to the server II local mailbox table 66. The store 64 is confirmed as being able to accept the new mailbox by confirming that (1) the store 64 has available storage space and is under no special mailbox-creation restriction such as a security restriction, and (2) the server I mailbox is not already being moved to server II, i.e., a flagged entry 68 does not already exist for a new mailbox corresponding to the server I mailbox. Server II maintains a list 78 of moving mailboxes similar to the list 74 of server I.

One or more mailboxes can be moved away from a server at the same time one or more mailboxes are being moved to the server. For simplicity and efficiency, the server does not maintain a separate "mailboxes leaving" list and a separate "mailboxes arriving" list. Rather, a server's list of moving mailboxes includes an entry for each of the server's mailboxes that is associated with a move in progress, i.e., that is being moved away from or to the server. Thus, only one list needs to be checked on each server involved in a move.

All of the flags in the lists 74, 78 of moving mailboxes are stored in volatile memory. As explained below in a discussion about recovering from an incomplete move, the use of volatile memory allows the move to recover reliably from a move failure resulting from, e.g., a power loss.

After the new mailbox is created, copying of the contents of the server I mailbox to the server II mailbox is commenced (step 220). The contents are copied by copying the server I mailbox's messages and folders of messages to the server II mailbox. Copying the messages and folders may involve copying the full contents of each message or folder or copying a pointer to the full contents, or both.

Each message arriving for the user during the copying is then delivered to a server I temporary store 80 (step 230). Delivery is acknowledged so that message delivery failure is not reported even though the message has not yet been delivered to a mailbox corresponding to the user. As discussed in more detail below, the temporary store is implemented in non-volatile memory to allow the move to recover reliably from a move failure resulting from, e.g., a system failure. The arriving message is delivered to the temporary store regardless of the server to which the message's source corresponds. If, for example, the message's source corresponds to server II, the message is first submitted to the server I MTA 52, because the user's server II directory entry points to server I. When the message is submitted to the server I MTA, the message is delivered to the temporary store, not the server I mailbox, because the server I mailbox's "move-in-progress" flag 72 is detected. The message follows a similar path if the message's source corresponds to another server such as server III (FIG. 1) instead.

If the message's source corresponds to server I, i.e., corresponds to the same server as the server I mailbox, the optimization technique is not invoked, because the server I mailbox's "move-in-progress" flag 72 is detected. As a result, the message is submitted to the server I MTA and is then delivered to the temporary store instead of to the server I mailbox.

The copying is complete when all of the contents of the server I mailbox have been copied to the server II mailbox (step 240). Next, both servers' directories are updated to direct messages, that are arriving for user, to the new server II mailbox instead of to the server I mailbox (step 250). As a standard feature of the messaging system, an update made to the directory of one server is automatically replicated on the directories of the other servers in the system. However, the amount of time involved in the automatic replication is usually significant. Therefore, the updates to the server I directory and the server II directory are made directly, without relying on the replication feature. In time, these updates to the server I directory and the server II directory are automatically replicated in all other directories on the system. The direct updates ensure, however, that all messages directed to the user after the direct updates are made, especially messages sent before automatic replication has reached all servers, end up in the server II mailbox. For example, if the directory of server III (FIG. 1) has not yet been reached by automatic replication, such a message directed from server III first arrives at the server I MTA. The server I directory 54 then indicates to the server I MTA 52 that the message should be re-directed to the server II MTA 62 for delivery to the user's server II mailbox.

After the directories are updated, the messages that were delivered to the temporary store are submitted to the server I MTA 52 (step 260). Because the server I directory now points to the server II mailbox, all of the messages from the temporary store are delivered to the server II mailbox.

Finally, the server I mailbox is deleted (step 270), completing the move of the user's mailbox from server I to server II.

The "move-mailbox" subfunction just described is thus able to deliver reliably messages that arrive for a user while the user's mailbox is being moved from server I to server II. The ability extends to recovery from a move that is incomplete. For example, in the event that the move fails and must be restarted due to, e.g., a system failure while the contents are being copied (FIG. 3, steps 220, 240), the messages that arrived for the user during the failed move are not lost. The messages are retained in the temporary store and are submitted to the server I MTA for delivery before the move is restarted. As noted above, the temporary store is implemented in non-volatile memory, e.g., a computer hard disk, so that messages survive in the temporary store even if the system failure results from a power loss.

The "move-in-progress" flags, however, are stored in volatile memory so that the flags do not survive a system failure that results from a power loss. As a result, when the system restarts, the user's system I mailbox is not flagged as being associated with a move in progress. Removing the flag prevents the failed move from resulting in confusion and allows the mailbox to function normally until the move is restarted.

Message delivery failure in general is minimized because each message that is delivered to the temporary store is acknowledged as being delivered. This acknowledgement allows the move to take place without causing apparent delivery delays. Message delivery failure due to circular path detection is also minimized because the temporary stores provides an endpoint for the messages.

Message delivery failure is technically possible within the period of time, if any, between when the update to the server I directory takes effect and when the update to the server II directory takes effect (FIG. 3, step 250). The updates are commenced essentially simultaneously but may take effect milliseconds apart, depending on the nature of the server computers' hardware and software. During this period of time between effecting the two updates, the server I directory points to the server II mailbox and the server II directory points to the server I mailbox. A message arriving for the user during this period is first directed to server I, because all of the system's directories, except for the server I directory, point to the user's server I mailbox. Server I then re-directs the message to server II, because the server I directory points to the user's server II mailbox. Server II, however, then re-directs the message back to server I, because the server II directory points to the user's server I mailbox. At that point, a circular path, from server I back to server I, is detected and the message is subjected to message delivery failure. Preferably the server computers' hardware and software are optimized to minimize the period of time between effecting the two updates.

Other embodiments are within the scope of the following claims. For example, a second temporary store may be used at the move's destination server, e.g., server II. In such a case, messages directed from server II to the user are captured by server II's optimization technique and are then held in the server II temporary store. These messages are then submitted to the server II MTA at the same time that messages from the server I temporary store are submitted to the server I MTA. In addition, in a messaging system where mailboxes are stored on different volumes, e.g., hard disks, within the same server, a temporary store may be associated with a volume instead of with a server. In that case, messages arriving for a user are reliably received while the user's mailbox is being moved from one volume to another volume.

What is claimed is:

1. In a messaging system including a first network server and a second network server, each associated with a storage medium, a method for preserving a message addressed to an original mailbox while the mailbox is moved from the first network server to the second network server, the method comprising the steps of:

creating a new mailbox at a second storage medium associated with the second network server;

beginning copying the contents of an original mailbox to the new mailbox, the original mailbox being located at a first storage medium associated with the first network server;

intercepting, at the first network server, a message addressed to the original mailbox;

delivering the message to a temporary data storage area associated with the first network server;

completing copying the contents to the new mailbox; and delivering the message from the temporary data storage area to the new mailbox.

2. The method of claim 1, further comprising the step of acknowledging delivery of the message to a sender of the message prior to the step of delivering the message from the temporary data storage area to the new mailbox.

3. The method of claim 1, wherein the original mailbox and the new mailbox comprise a folder of messages.

4. The method of claim 3, wherein the step of delivering the message from the temporary data storage area to the new mailbox comprises the step of delivering the message to the folder according to at least one automatic folder-storage rule.

5. The method of claim 1, wherein the temporary data storage area is non-volatile and retains the message in the event that an attempt to create the new mailbox is unsuccessful.

6. The method of claim 1, further comprising the step of marking the original mailbox with a flag to indicate that the original mailbox is in a process of moving, the step of intercepting the message being performed based on the flag.

7. The method of claim 6, wherein the flag is stored in a volatile memory such that in the event of a power loss during the process of moving, the original mailbox is automatically unmarked.

8. The method of claim 6, wherein a plurality of mailboxes is able to be moved at the same time;

a list of marked mailboxes exists at each network server; and each list includes every mailbox currently moving to the network server at which the particular list exists and every mailbox currently moving away from the network server at which the particular list exists, said mailboxes currently moving to the network server and said mailboxes currently moving away from the network server being deleted from the list after said mailboxes are no longer currently being moved.

9. The method of claim 1, wherein each network server comprises a directory associating mailboxes with network servers; and the method further comprises updating each directory directly to associate the new mailbox with the second network server.

10. The method of claim 1, further comprising the steps of:

intercepting, at the second network server, a second message originating from the second network server and being addressed to the original mailbox;

delivering the second message to a second temporary data storage area associated with the second network server; and delivering the second message from the second temporary data storage area to the new mailbox.

11. Computer software, residing on a computer-readable storage medium, comprising instructions for use in a computer system to cause the computer system to preserve a message addressed to a mailbox of a messaging system while the mailbox is moved from a first network server to a second network server, the instructions causing the computer system to:

create a new mailbox at a second storage medium associated with the second network server;

begin copying the contents of an original mailbox to the new mailbox, the original mailbox being located at a first storage medium associated with the first network server;

intercept, at the first network server, a message addressed to the original mailbox;

deliver the message to a temporary data storage area associated with the first network server;

complete copying the contents to the new mailbox; and deliver the message from the temporary data storage area to the new mailbox.

12. The computer software of claim 11, wherein the instructions further cause the computer system to acknowledge delivery of the message to a sender of the message prior to the message being delivered from the temporary data storage area to the new mailbox.

13. The computer software of claim 11, wherein the original mailbox and the new mailbox comprise a folder of messages.

14. The computer software of claim 13, wherein the message is delivered from the temporary data storage area to the folder of the new mailbox according to at least one automatic folder-storage rule.

15. The computer software of claim 11, wherein the temporary data storage area is non-volatile and retains the message in the event that an attempt to create the new mailbox is unsuccessful.

16. The computer software of claim 11, wherein the computer software further comprises instructions for causing the computer system to mark the original mailbox with a flag to indicate that the original mailbox is in a process of moving, the instructions causing the computer system to intercept the message based on the flag.

17. The computer software of claim 16, wherein the flag is stored in a volatile memory such that in the event of a power loss during the process of moving, the original mailbox is automatically unmarked.

18. The computer software of claim 16, wherein the instructions further cause the computer system to:

enable a plurality of mailboxes to be moved at the same time; and establish a list of marked mailboxes at each network server each list including every mailbox currently moving to the network server at which the particular list exists and every mailbox currently moving away from the network server at which the particular list exists, said mailboxes currently moving to the network server and said mailboxes currently moving away from the network server being deleted from the list after said mailboxes are no longer currently being moved.

19. The computer software of claim 11, wherein each network server comprises a directory associating mailboxes with network servers; and the computer software further comprises instructions for causing the computer system to update each directory directly to associate the new mailbox with the second network server.

20. The computer software of claim 11, wherein the instruction further cause the computer system to:

intercept, at the second network server, a second message originating from the second network server and being addressed to the original mailbox;

deliver the second message to a second temporary data storage area associated with the second network server; and deliver the second message from the second temporary data storage area to the new mailbox.

* * * * *

UNITED STATES PATENT AND TRADEMARK OFFICE
CERTIFICATE OF CORRECTION

PATENT NO. : 5,915,004
DATED : June 22, 1999
INVENTOR(S) : Ramesh B. Pabbati, Patrick Y. Ng, John H. Howard
William H. Rockenbeck, Max L. Benson It is certified that error appears in the above-identified patent and that said Letters Patent are hereby corrected as shown below:

Col. 2, ln. 49: after "Message" change "deliver" to --delivery--

Col. 3, ln. 53: before "to the mailbox" change "redelivery" to --re-delivery--

Col. 8, ln. 5: after "stores" change "provides" to --provide--

Col. 8, ln. 27: after "between" change "effecting" to --affecting--

Col. 10, ln. 55: after "further" change "cause" to --causes--

Signed and Sealed this

Thirteenth Day of June, 2000

Attest:

Q. TODD DICKINSON

*Attesting Officer*  *Director of Patents and Trademarks*